(12) United States Patent
Hongo

(10) Patent No.: US 10,427,294 B2
(45) Date of Patent: Oct. 1, 2019

(54) PARALLEL LINK ROBOT AND PARALLEL LINK STRUCTURE

(71) Applicant: SONY CORPORATION, Tokyo (JP)

(72) Inventor: Kazuo Hongo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 279 days.

(21) Appl. No.: 15/326,240

(22) PCT Filed: Jun. 9, 2015

(86) PCT No.: PCT/JP2015/002881
§ 371 (c)(1),
(2) Date: Jan. 13, 2017

(87) PCT Pub. No.: WO2016/021099
PCT Pub. Date: Feb. 11, 2016

(65) Prior Publication Data
US 2017/0203433 A1    Jul. 20, 2017

(30) Foreign Application Priority Data
Aug. 6, 2014 (JP) ................................. 2014-160448

(51) Int. Cl.
*B25J 17/02* (2006.01)
*B25J 18/00* (2006.01)
(Continued)

(52) U.S. Cl.
CPC ........... *B25J 9/0051* (2013.01); *B25J 9/0045* (2013.01); *F16H 21/02* (2013.01); *F16H 21/46* (2013.01)

(58) Field of Classification Search
CPC .... B25J 17/0266; B25J 9/0051; B25J 9/0045; F16H 21/02; F16H 21/46
See application file for complete search history.

(56) References Cited

U.S. PATENT DOCUMENTS

2008/0196533 A1* 8/2008 Bergamasco ........ B25J 17/0266
74/490.06
2009/0019960 A1* 1/2009 Nabat .................. B25J 17/0266
74/490.03
(Continued)

FOREIGN PATENT DOCUMENTS

JP   10-329078 A   12/1988
JP   11-010575 A    1/1999
(Continued)

*Primary Examiner* — Jake Cook
(74) *Attorney, Agent, or Firm* — Chip Law Group

(57) ABSTRACT

There is provided a parallel link robot that includes a movable section, a plurality of first links, a plurality of connection sections, a plurality of second links, a plurality of first shaft sections, a plurality of third links, a plurality of second shaft sections, and a fixation unit including a plurality of driving sources. The plurality of first links are connected to the plurality of driving sources. The plurality of connection sections are connected to the plurality of first links. The plurality of second links are connected to the plurality of first links via the plurality of connection sections. The plurality of first shaft sections are connected to the plurality of second links. The plurality of third links are connected to the plurality of second links via the plurality of first shaft sections, and to the movable section through the plurality of second shaft sections.

15 Claims, 11 Drawing Sheets

(51) Int. Cl.
*B25J 9/00* (2006.01)
*F16H 21/02* (2006.01)
*F16H 21/46* (2006.01)

(56) References Cited

U.S. PATENT DOCUMENTS

| | | | | |
|---|---|---|---|---|
| 2010/0101359 A1* | 4/2010 | Breu | ................... | B25J 17/0266 |
| | | | | 74/490.06 |
| 2011/0113918 A1 | 5/2011 | Zhao | | |
| 2012/0079908 A1* | 4/2012 | Long | ..................... | B25J 9/0051 |
| | | | | 74/490.05 |
| 2014/0318300 A1* | 10/2014 | Yazawa | ................. | B25J 9/0051 |
| | | | | 74/490.05 |
| 2015/0343631 A1* | 12/2015 | Martinez-Esponda | ..................... | |
| | | | | B25J 9/0051 |
| | | | | 74/490.03 |
| 2016/0368136 A1* | 12/2016 | Brog Rdh | .............. | B25J 9/0051 |

FOREIGN PATENT DOCUMENTS

| | | |
|---|---|---|
| JP | 4659098 B2 | 3/2011 |
| JP | 2013-059852 A | 4/2013 |
| JP | 2013-215864 A | 10/2013 |
| JP | 2014-076510 A | 5/2014 |
| WO | 03/086717 A1 | 10/2003 |

\* cited by examiner

PARALLEL LINK ROBOT AND PARALLEL LINK STRUCTURE

CROSS REFERENCE TO RELATED APPLICATIONS

This application is a U.S. National Phase of International Patent Application No. PCT/JP2015/002881 filed on Jun. 9, 2015, which claims priority benefit of Japanese Patent Application No. JP 2014-160448 filed in the Japan Patent Office on Aug. 6, 2014. Each of the above-referenced applications is hereby incorporated herein by reference in its entirety.

TECHNICAL FIELD

The present technology relates to a parallel link robot and to a parallel link structure used therefor.

BACKGROUND ART

A parallel link robot has characteristics of, for example, very lightweight configuration of movable sections serving as fingers, relatively low manufacture cost, and elimination of a need to move motors themselves due to concentrated arrangement of driving motors on a base. Therefore, in recent years, the parallel link robot attracts attention as an industrial robot.

A parallel link robot described in Patent Document 1 is generally called hexa-type parallel link robot. It includes, for example, a total of three sets of two arms and the three sets of arms are connected to a periphery of a movable plate via universal joints (e.g., see paragraph [0015] of Patent Document 1).

Such a hexa-type parallel link structure is characterized in that it is simple, can be easily designed, and has a wide range of translational motion. However, with this structure, a range of rotational motion of the movable plate is small and about ±30° is the limit.

A parallel link robot described in Patent Document 2 is capable of performing a translational motion having three degrees of freedom due to parallel links. Further, the parallel link robot includes a drive mechanism that rotates members called posture-changing mechanism unit around three axes with respect to movable members serving as fingers. This drive mechanism transmits driving force for motors, which are provided in an upper portion, to the posture-changing mechanism unit via driving shafts (54-1, 54-2, 54-3).

Patent Document 1: Japanese Patent Application Laid-open No. 2013-059852
Patent Document 2: Japanese Patent No. 4659098

DISCLOSURE OF INVENTION

Technical Problem

The parallel link robot of Patent Document 2 has a large range of rotational motion but an entire structure thereof is complicated because a mechanism for translational motion and a mechanism for rotational motion are independent and a combination of them constitute such a parallel link robot.

It is an object of the present technology to provide a parallel link robot and a parallel link structure, by which a range of rotational motion which is as large as possible is provided with a relatively simple structure.

Solution to Problem

In order to accomplish the above-mentioned object, a parallel link robot according to the present technology includes a fixation unit, a movable section for operation, a plurality of first links, a plurality of connection sections, a plurality of second links, a plurality of first shaft sections, a plurality of third links, and a plurality of second shaft sections.

The fixation unit includes a plurality of driving sources.

The plurality of first links are connected to the plurality of driving sources.

The plurality of connection sections are rotatably connected to the plurality of first links.

The plurality of second links are rotatably connected to the plurality of first links via the plurality of connection sections.

The plurality of first shaft sections are rotatably connected to the plurality of second links.

The plurality of third links are rotatably connected to the plurality of second links via the plurality of first shaft sections.

The plurality of third links are rotatably connected to the movable section through the plurality of second shaft sections, the plurality of second shaft sections extending peripherally outward from the movable section.

In this manner, the second shaft sections extend peripherally outward from the movable section, the third links are connected to the second shaft sections, and the second links are connected to the third links. Thus, end portions of the second links are arranged at positions offset from positions of the second shaft sections. With this, a range of rotational motion can be made large, and a parallel link robot with a relatively simple structure can be provided.

The plurality of third links may constitute a pair of third links constituted of two third links. Further, the pair of third links may be connected to the movable section through one second shaft section of the plurality of second shaft sections.

With this, a peripheral configuration of the movable section can be reduced in size. Further, the number of components can be reduced.

The pair of third links may have different length.

With this, the range of rotational motion can be made as large as possible while eliminating interference of members including the third links.

The plurality of second links, the plurality of third links, and the movable section may be arranged such that a virtual plane including connection positions of the plurality of first shaft sections in the plurality of second links is located farther from the fixation unit than a virtual plane including connection positions of the plurality of second shaft sections in the movable section.

At least one of the plurality of third links may be constituted of an L-shaped block.

This contributes to making the range of rotational motion large while eliminating interference.

The plurality of driving sources may include a set of driving sources including a set of parallel output shafts.

The fixation unit may include a support that supports the set of driving sources such that output shafts of the set of driving sources are non-coaxial.

With this, a degree of freedom of arrangement of the set of driving sources including the parallel output shafts can be increased.

The support may include a supporting plate or a supporting frame configured such that the output shafts pass therethrough, the supporting plate or the supporting frame being provided between main bodies of the set of driving sources.

That is, the set of driving sources is installed such that the single supporting plate or supporting frame is sandwiched between the set of driving sources and driving force from the output shafts is inwardly output. With this, relative position accuracy of the set of driving sources can be enhanced and parallelism accuracy of the output shafts can be enhanced.

The plurality of first links may include a set of first links constituted of two first links, the plurality of second links may include a set of second links constituted of two second links, and the plurality of third links may include a set of third links constituted of two third links. Further, the set of first links, the set of second links, and the set of third links may constitute one or more sets of arms.

The plurality of sets of arms may be arranged at equal intervals around a virtual center axis linking a center of the fixation unit with a center of the movable section.

The plurality of second shaft sections may be provided obliquely to a virtual plane including positions at which the second shaft sections are connected to the movable section.

With this, lock (e.g., gimbal lock) at a singular point can be suppressed and a much larger range of rotational motion can be provided.

The plurality of second shaft sections may be provided such that the plurality of second shaft sections are spaced away from the fixation unit in a direction of a virtual center axis linking a center of the fixation unit with a center of the movable section as the plurality of second shaft sections extend peripherally outward from the movable section.

Another parallel link robot according to present technology includes the fixation unit, the movable section, the plurality of first links, the plurality of second links, the plurality of first shaft sections, and the plurality of third links, which are described above. Further, the parallel link robot includes a plurality of second shaft sections with the plurality of third links being connected to the movable section.

Further, the plurality of second links are connected to the movable section via the plurality of third links such that end portions of the plurality of second links, to which the plurality of first shaft sections are connected, are arranged at positions offset from the plurality of second shaft sections, the positions being offset peripherally outward from the movable section.

A parallel link structure according to the present technology includes the elements other than the fixation unit in the above-mentioned parallel link robot.

Advantageous Effects of Invention

As described above, in accordance with the present technology, a range of rotational motion which is as large as possible can be provided with a relatively simple structure.

It should be noted that the effects described here are not necessarily limitative and may be any effect described in the present disclosure.

BRIEF DESCRIPTION OF DRAWINGS

FIG. 11 B is a perspective view thereof as viewed from below.

MODE(S) FOR CARRYING OUT THE INVENTION

Hereinafter, embodiments of the present technology will be described with reference to the drawings.

1. First Embodiment (1) Overall Configuration of Parallel Link

Figure 1:
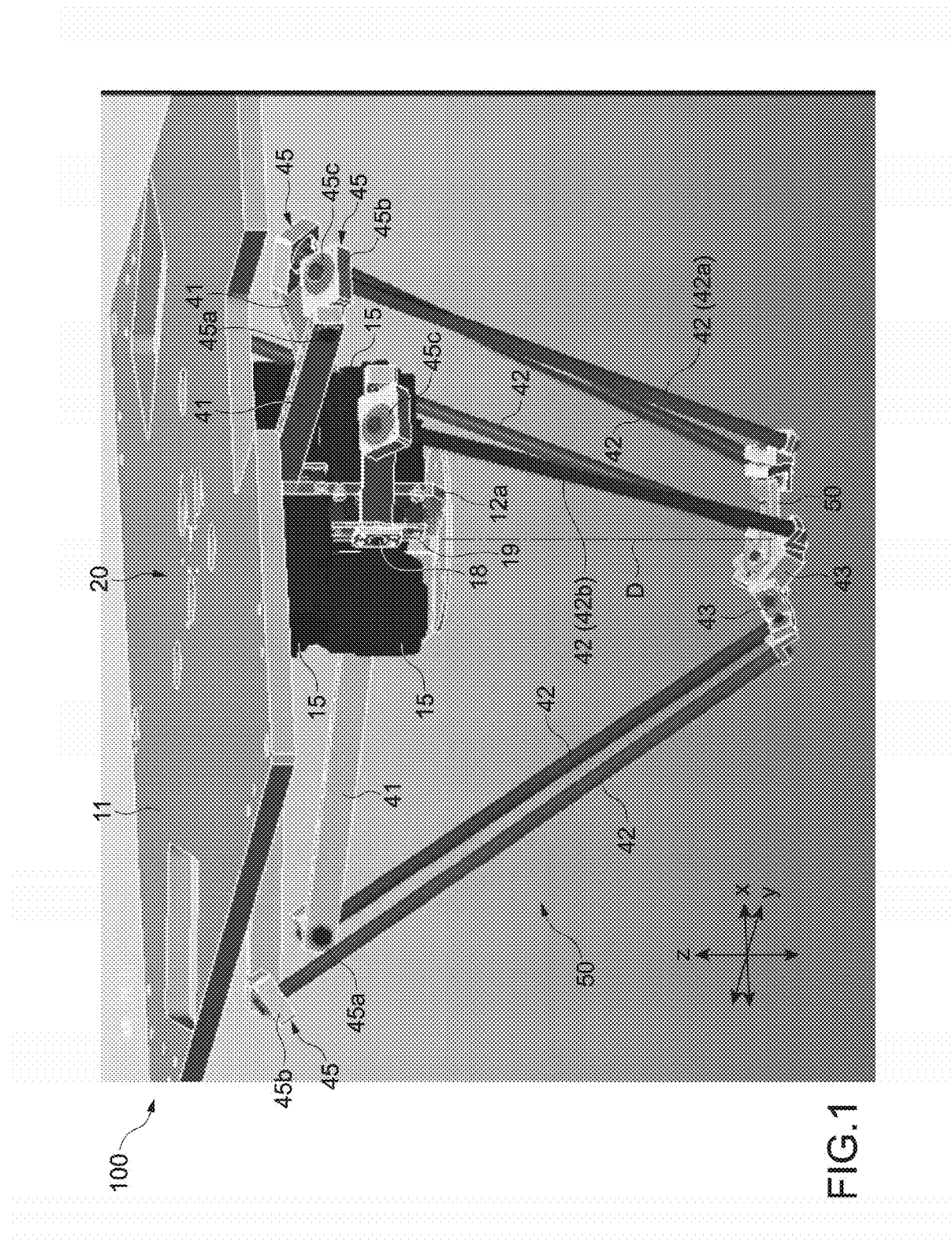
FIG. 1 is a diagram showing a parallel link robot according to an embodiment of the present technology.

FIG. 1 is a diagram showing a parallel link robot according to a first embodiment of the present technology. A parallel link robot 100 is a parallel link robot having six degrees of freedom. The parallel link robot 100 includes a fixation unit 20 and a parallel link structure 50 connected to the fixation unit 20. The fixation unit 20 is fixed to, for example, a stationary top plate 11 or a stationary frame (not shown).

Note that, in FIG. 1, upper and lower directions in the figure are set to a z-axis and two axes orthogonal to the z-axis are set to an x-axis and a y-axis.

(2) Configuration of Fixation Unit

Figure 2:
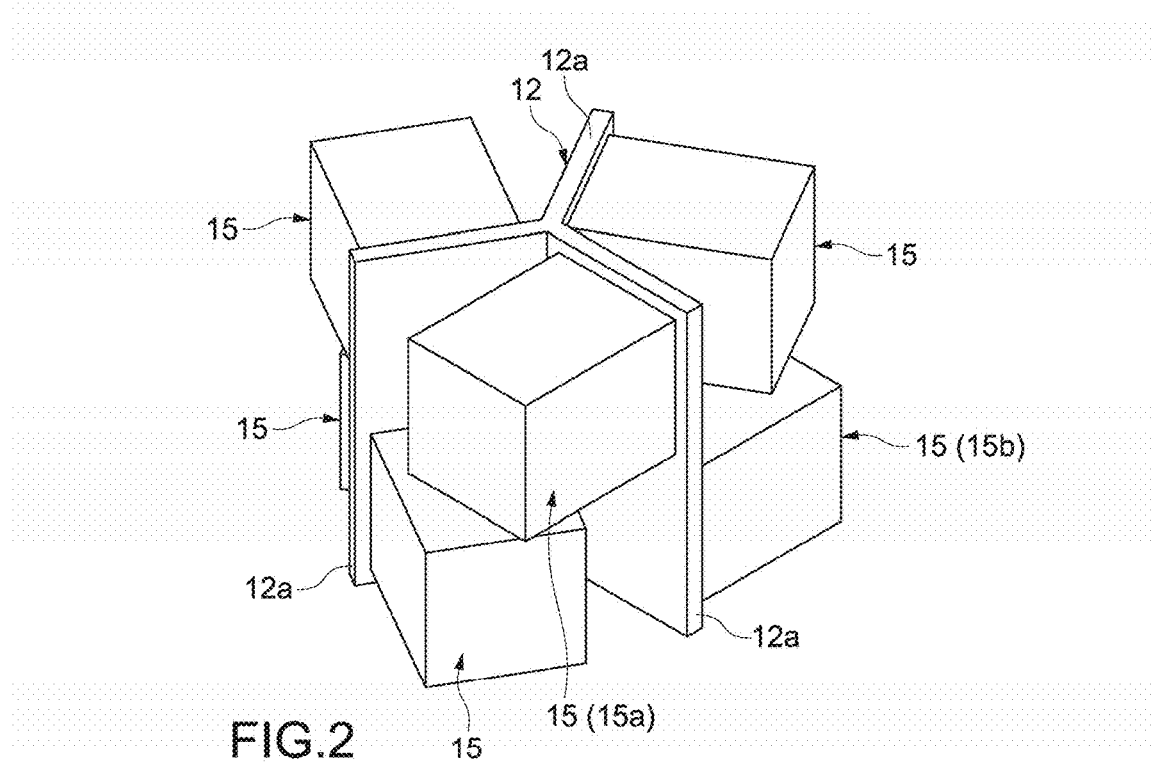
FIG. 2 is a perspective view schematically showing a fixation unit.
Figure 3:
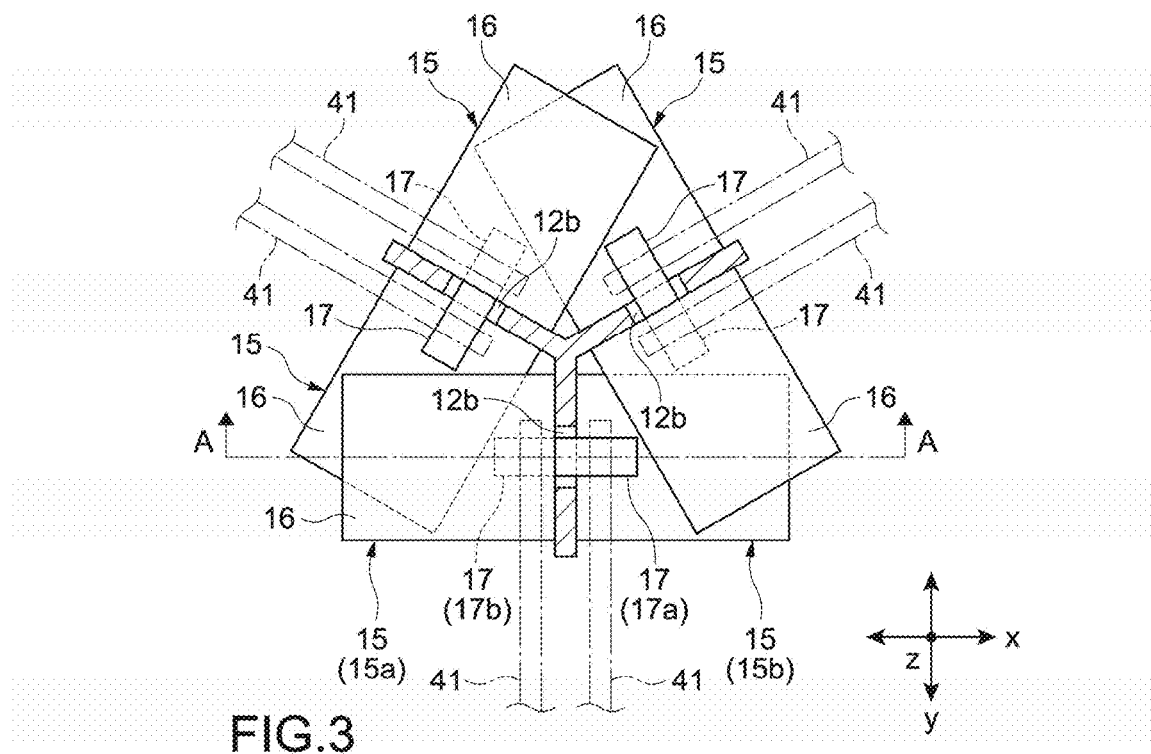
FIG. 3 is a plan view showing the fixation unit shown in FIG. 2.
Figure 4:
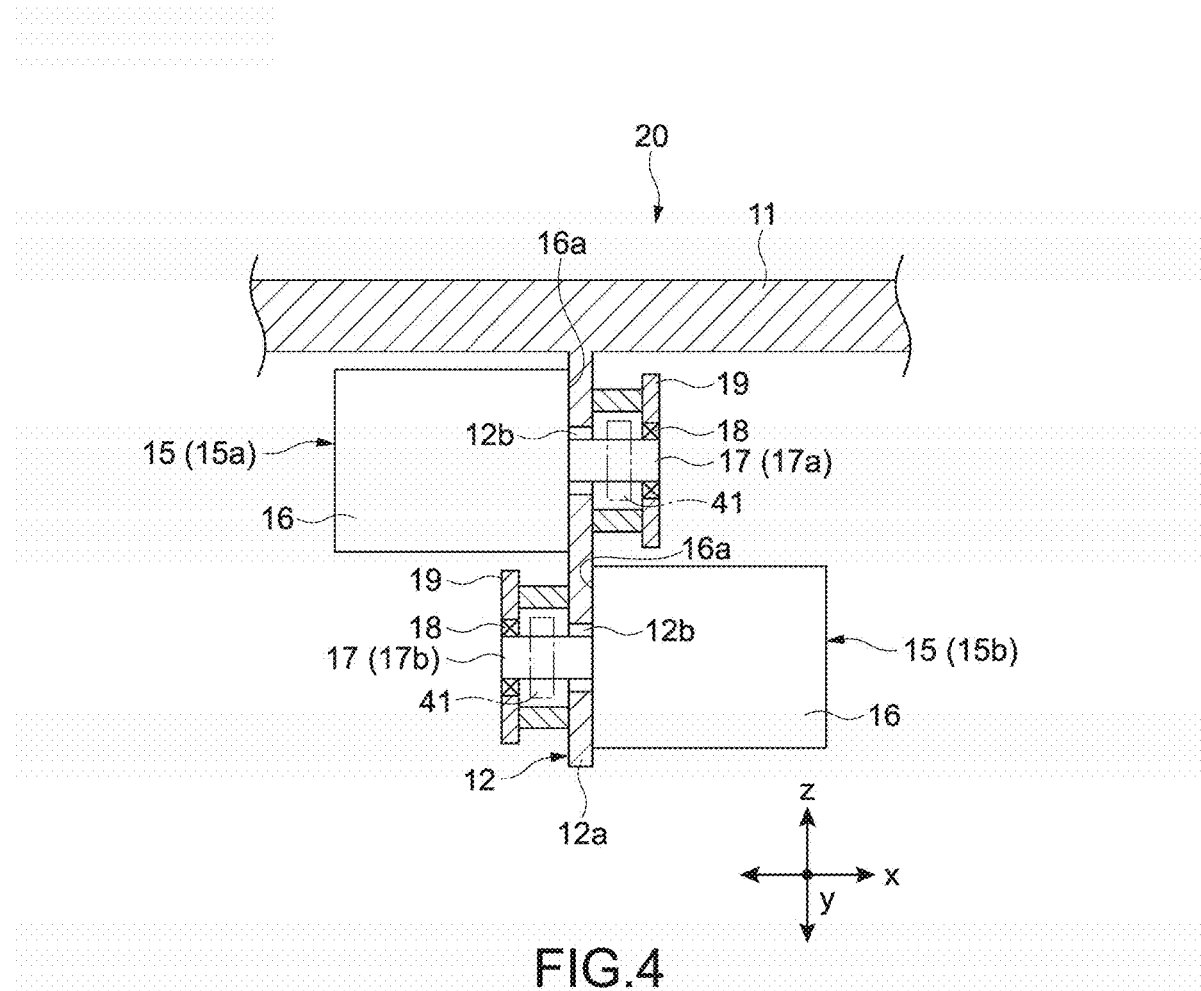
FIG. 4 shows a part of a cross-section taken along the line A-A of FIG. 3.

FIG. 2 is a perspective view schematically showing the fixation unit 20. FIG. 3 is a plan view of the fixation unit 20 shown in FIG. 2. FIG. 4 shows a part of a cross-section taken along the line A-A of FIG. 3.

The fixation unit 20 includes a plurality of motors (driving sources) 15 and a support 12 that supports the motors 15. The support 12 includes three supporting plates 12a. The three supporting plates 12a are arranged at predetermined angular intervals, here, at 120° intervals around the z-axis. Each of the supporting plates 12a may be formed integrally with the top plate 11 or may have a structure that is mounted and fixed on the top plate 11. The supporting plates 12a may be replaced by a frame-like member (supporting frame).

As shown in FIG. 3, a set of motors 15a and 15b of the motors 15, which include a set of parallel output shafts 17a and 17b, is mounted on one of the supporting plates 12a. Here, two motors 15a and 15b, between which driving-force outputting directions of output shafts 17 are different by 180°, are mounted on one of the supporting plates 12a. In other words, the set of motors 15a and 15b is mounted on the supporting plate 12a while facing each other. This fixation unit 20 includes three sets of motors 15a and 15b, and thus a total of six motors 15. As shown in FIGS. 2 and 4, the set of motors 15a and 15b mounted on the supporting plate 12a is arranged at positions offset in a z-axis direction. That is, the set of motors 15a and 15b is mounted on the supporting plate 12a such that the output shafts 17a and 17b thereof are non-coaxial.

Driving of each of the six motors 15 is individually controlled by a control unit (not shown).

As shown in FIG. 4, a flange surface 16a of a main body 16 of each of the motors 15 is connected to the supporting plate 12a with bolts or the like (not shown) directly or indirectly via a member (not shown). The output shaft 17 of the motor 15 is provided passing through a hole 12b formed in the supporting plate 12a and extending to an opposite side of a side, on which the main body 16 is positioned, with respect to the supporting plate 12a. For example, the output shaft 17 of the motor 15 is rotatably connected to a bearing 18 held by a bearing holder 19. A first link 41 of the parallel link structure 50, which will be described later, is connected and fixed to each output shaft.

Note that members other than the supporting plates 12a and the main bodies 16 of the motors 15 are not shown in FIG. 2 and FIG. 2 is provided for the purpose of mainly showing an arrangement relationship among the motors 15.

As described above, the motors 15 are arranged such that the output shafts 17 (17a, 17b) of the set of motors 15a and 15b are non-coaxial. Thus, a degree of freedom of arrangement for the motors 15 can be increased in comparison with coaxial output shafts. In particular, in this embodiment, the set of motors 15a and 15b is mounted on the single supporting plate 12a, and hence relative arrangement accuracy of the set of motors 15a and 15b, that is, parallelism accuracy (linearity) of the output shafts 17a and 17b can be enhanced. With this, driving accuracy and positioning accuracy of the parallel link structure 50 connected to the output shafts 17 can be enhanced.

(3) Configuration of Parallel Link Structure

Next, a configuration of the parallel link structure 50 connected to the fixation unit 20 will be described. Hereinafter, all configurations of the links and the like driven by the three sets of motors 15 are substantially identical, and hence a link structure driven by connection of the set of motors 15a and 15b will be mainly described. Further, the entire link structure will be described if necessary.

The first links 41 parallel as viewed in the z-axis direction are connected and fixed on the output shafts 17a and 17b of the set of motors 15a and 15b (see FIG. 3). As shown in FIG. 1, second links 42 are rotatably connected to the first links 41 via connection sections 45.

As an example, the connection section 45 includes a rotation shaft 45a and a connection block 45b. The rotation shaft 45a is rotatably connected to an end portion of the first link 41. The connection block 45b is fixed on the rotation shaft 45a. One ends of the second links 42 are rotatably connected to the connection block 45b. With this, degrees of freedom of rotation are provided around two axes in the connection section 45.

The connection section 45 includes a bearing 45c. This bearing makes the second link 42 rotatable. The rotation shaft 45a may also be connected to the first link 41 via the bearing or a configuration in which a pin serving as the rotation shaft 45a is inserted into a hole formed in the first link 41 may be employed.

The set of second links 42a and 42b (see FIGS. 1, 3, 4) correspondingly connected to the set of motors 15a and 15b is set to have a distance therebetween such that they do not interfere with each other during motion.

Figure 5:
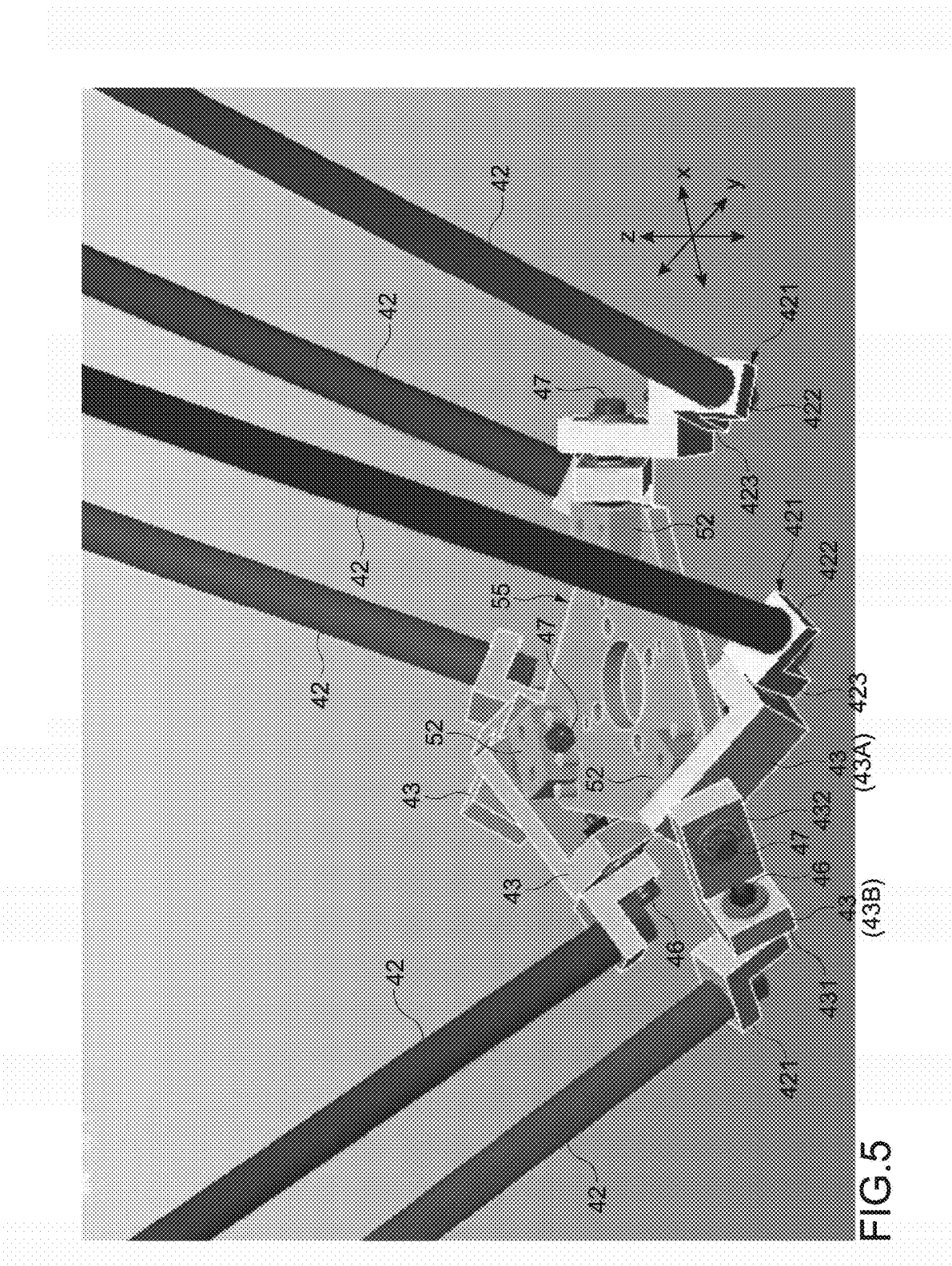
FIG. 5 is a perspective view showing a structure from second links to a movable plate for operation.

FIG. 5 is a perspective view showing a structure from the second links 42 to a movable plate (movable section) 55 for operation.

The other end of the second link 42 includes an end block 421. The end block 421 has an L-shape including a first side portion 422 and a second side portion 423, for example. A main body of the second link 42 is mounted and fixed on the first side portion 422 and a third link 43 is rotatably connected to the second side portion 423 via a rotation shaft 46 (first shaft section). Since the end block 421 has an L-shape, the rotation shaft 46 extends in a direction substantially orthogonal to an axis extending along a longitudinal direction of the second link 42.

For example, the third link 43 has an L-shaped block shape and includes a first side portion 431 and a second side portion 432. The third link 43 is, at the first side portion 431 thereof, connected to the second side portion 423 of the end block 421 via the rotation shaft 46. The third links 43 are, at the second side portions 432 thereof, connected through a common rotation shaft 47 (second shaft section) and the rotation shaft 47 is rotatably connected to the movable plate 55. That is, each of the third links 43 is rotatably connected to the movable plate 55 via the rotation shaft 47.

In this manner, a pair of third links 43A and 43B (see FIG. 5) is connected to the movable plate 55 through the common rotation shaft 47. Therefore, a peripheral configuration of the movable plate 55 can be reduced in size. Further, the number of components can be reduced.

With such a configuration, the third link 43 turns in a specific plane with respect to the movable plate 55. The shape of the movable plate 55, the length of the third link 43, and the like are suitably designed such that the pair of third links 43A and 43B and the movable plate 55, which are coaxially connected through the rotation shaft 47, do not interfere with each other when the movable plate 55 takes any posture.

Further, the third links 43 are favorably set to be short. It is because there is a fear that too long third links 43 may interfere with the second links 42, which reduces a range of rotational motion. As a matter of course, too short third links 43 are also not suitable and there is an optimal-length range. In particular, in this embodiment, the pair of third links 43A and 43B connected through the common rotation shaft 47 has different lengths. With this, the range of rotational motion can be made as large as possible while eliminating interference.

In addition, forming the third link 43 in an L-shape also contributes to the increase in range of rotational motion and the elimination of interference.

The movable plate 55 has a schematic triangular shape, for example, and has a shape obtained by cutting three apexes of the triangle. As shown in FIG. 5, connection sections 52 are provided in an upper surface near the apexes of the movable plate 55. The connection sections 52 are connected to the third links 43 and each have a block shape. The rotation shafts 47 are connected to the connection sections 52 thereof so as to extend peripherally outward from the movable section 55, for example, in a radial direction. The radial direction of the movable plate 55 specifically means a radial direction from a center in an x-y plane when this movable plate 55 is at a home position.

The home position of the movable plate 55, that is, the home position of the parallel link structure 50 is the position of the parallel link structure 50 shown in FIGS. 1 and 5. The home position is defined by (a), (b), and (c) below.

(a) Presence of three connection positions (hereinafter, referred to as plate connection positions), at which the rotation shafts 47 are connected to the third links 43, in the x-y plane, (b) Parallelism between an arrangement direction of the set of motors 15a and 15b and an arrangement direction of two plate connection positions corresponding to this set of motors 15a and 15b (corresponding via first links 41, second links 42, and third links 43), and (c) Alignment between a center position of the six motors 15 and a center position of the movable plate 55 as viewed in the z-axis direction.

The above-mentioned configuration of the parallel link robot 100 makes it possible to provide the parallel link structure 50 in which three sets of arms are arranged at equal intervals around a virtual center axis D (see FIG. 1) linking the center of the fixation unit 20 to the center of the movable plate 55 at the home position and extending along the z-axis. The arm is a link constituted of the first link 41, the second link 42, and the third link 43.

Further, with the above-mentioned configuration, this parallel link structure 50 is characterized in that, when it is at the home position, a virtual plane including connection positions of the rotation shafts 46 in the second links 42 is located farther from the fixation unit 20 than a virtual plane including the plate connection positions.

(4) Operation of Parallel Link Robot

Next, an operation of the parallel link robot 100 will be described. Here, descriptions on translational motions in three-axis (x-, y-, and z-axis) directions will be omitted and only rotations around the three axes (yaw, pitch, and roll) will be described.

(4-1) Rotation Around X-Axis (or Y-Axis)

Figure 6:
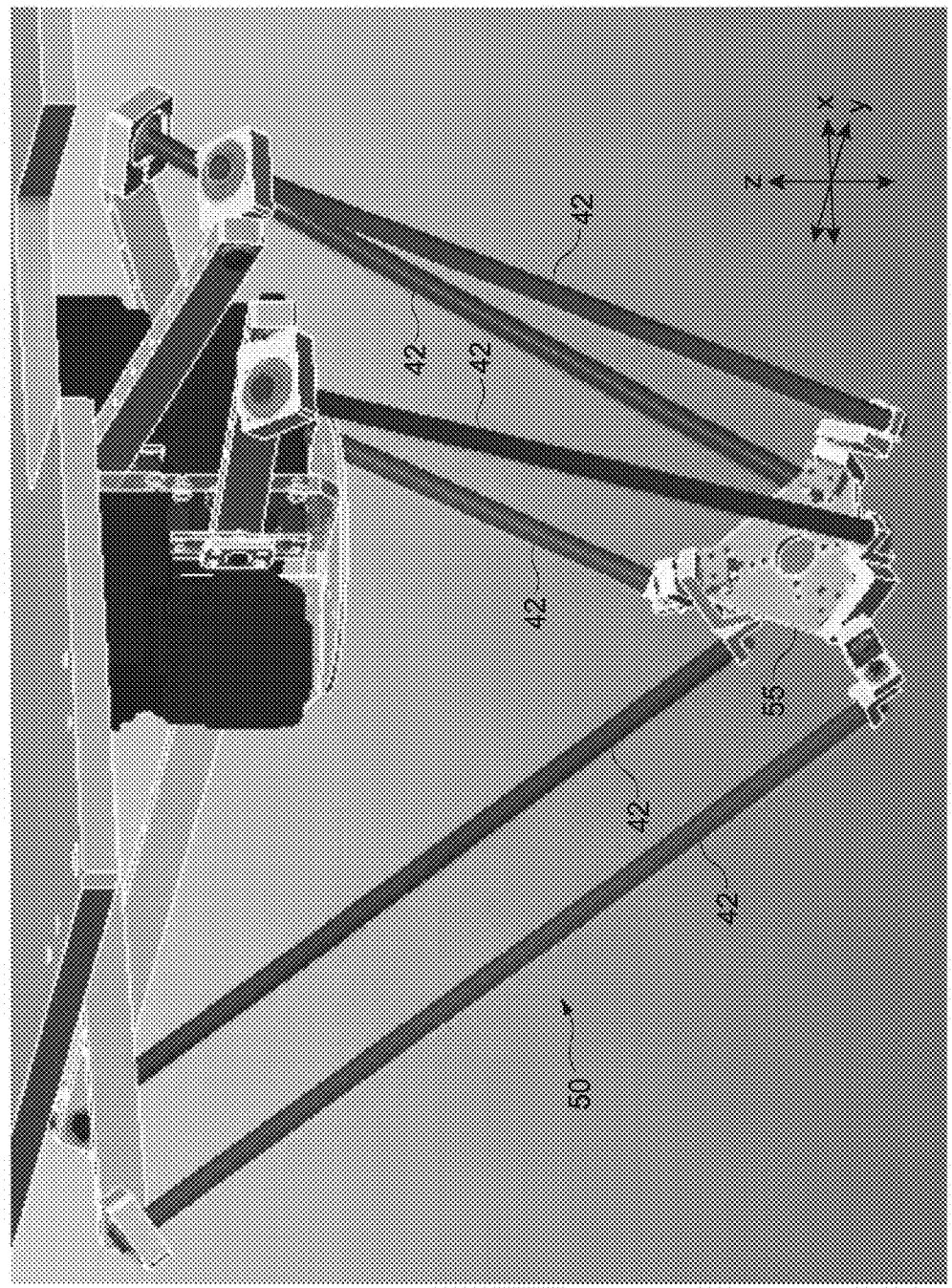
FIG. 6 shows the entire parallel link robot after the movable plate is rotated from a home position to a dead centre around an x-axis.
Figure 7:
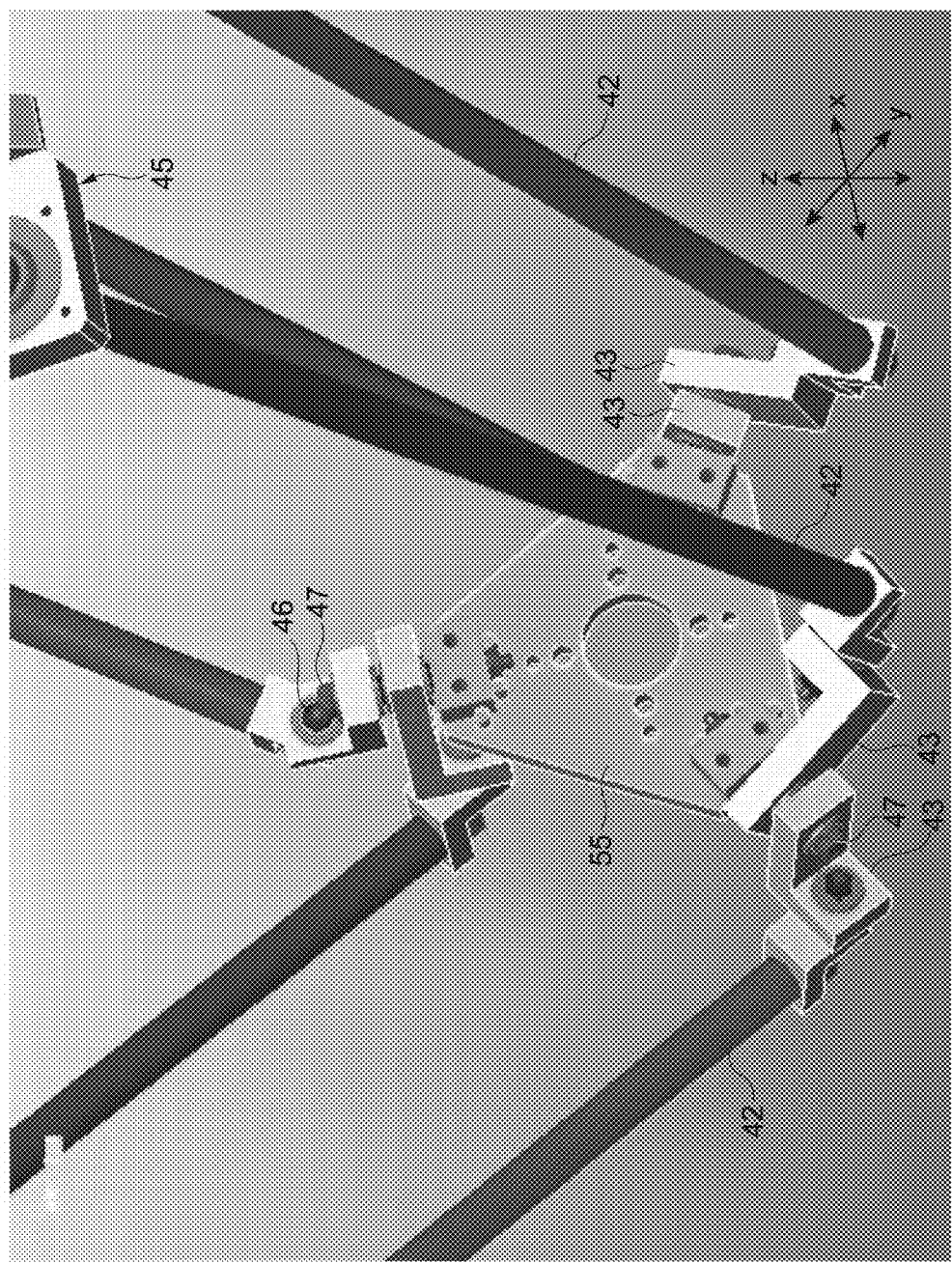
FIG. 7 shows the movable plate and a vicinity thereof in the state shown in FIG. 6.

FIG. 6 shows the entire parallel link robot 100 after the movable plate 55 is rotated from the home position to a dead centre around the x-axis. FIG. 7 shows the movable plate 55 and a vicinity thereof at that time. As can be seen from each of the figures, a pair of second links 42 shown on the rear side of the figure is lifted up and two sets of second links 42 on the front side of the figure are lowered, such that the movable plate 55 is rotated in one direction around the x-axis. As a matter of course, the movable plate 55 is also rotatable in an opposite direction around the x-axis. A range of rotational motion of about ±60° can be provided. Similarly, the movable plate 55 is also rotatable also around the y-axis by ±60°.

(4-1) Rotation Around Z-Axis

Figure 8:
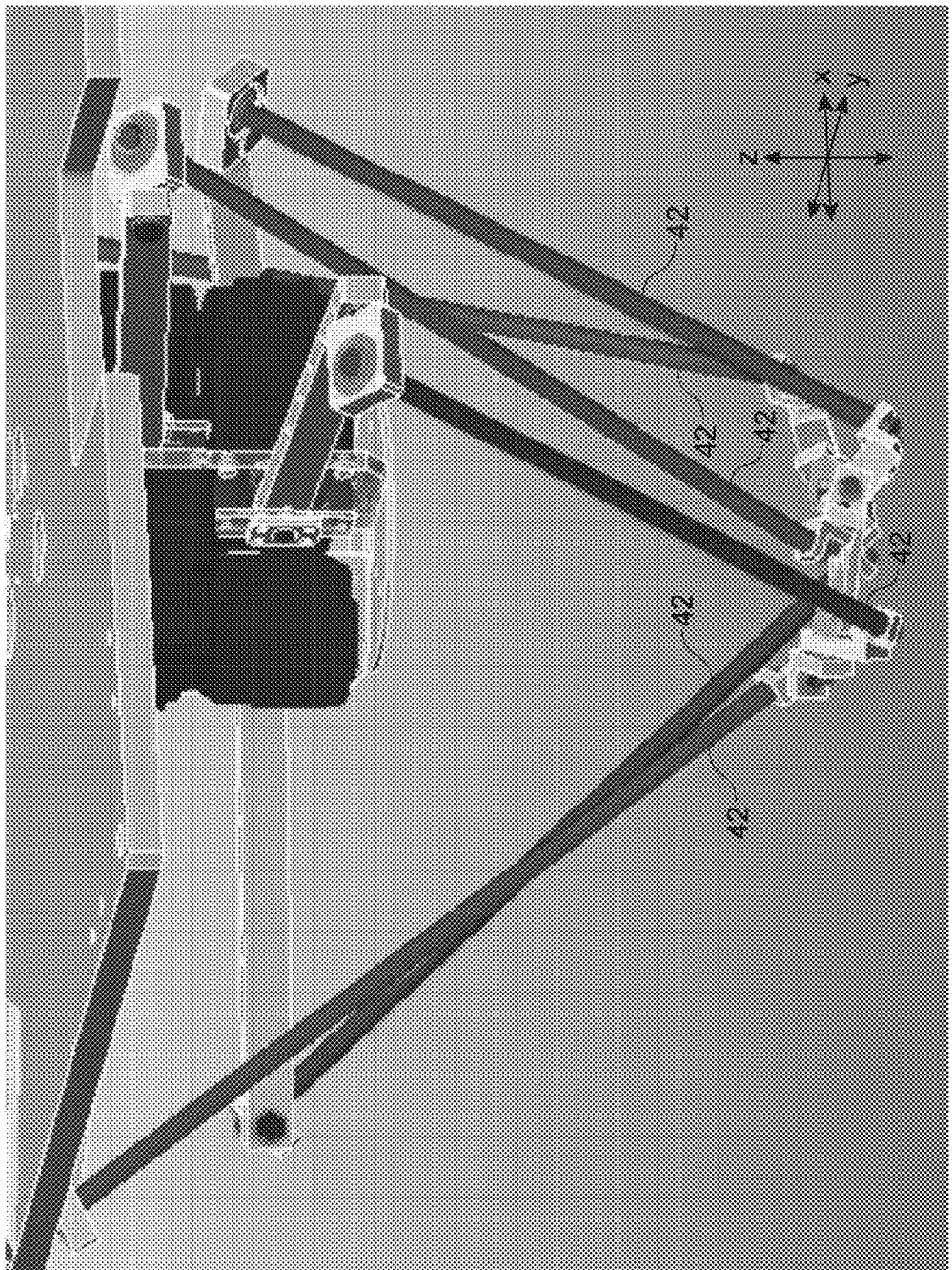
FIG. 8 shows the entire parallel link robot after the movable plate is rotated from the home position to the dead centre around a z-axis.
Figure 9:
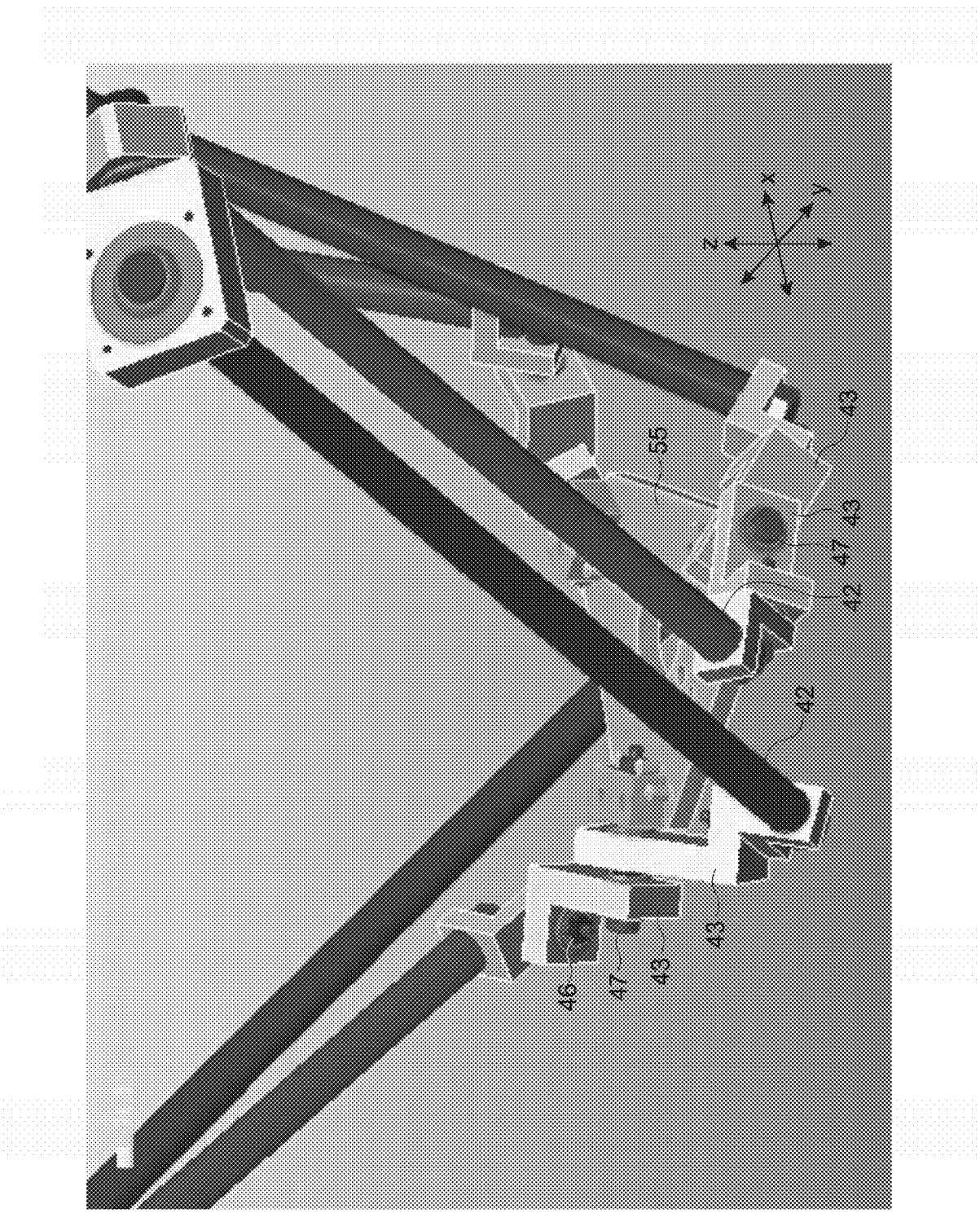
FIG. 9 shows the movable plate and a vicinity thereof in the state shown in FIG. 8.

FIG. 8 shows the entire parallel link robot 100 after the movable plate 55 is rotated from the home position to the dead centre around the z-axis. FIG. 9 shows the movable plate 55 and a vicinity thereof at that time. As can be seen from each of the figures, three second links 42 of all second links 42 arranged around the z-axis, which are provided every other second link around the z-axis, are lifted up and other three second links 42 are lowered, such that the movable plate 55 is rotated in one direction around the z-axis. As a matter of course, the movable plate 55 is also rotatable in an opposite direction around the z-axis. A range of rotational motion of about ±60° can be provided.

(4-2) Combined Motion

With this parallel link robot 100, at least one of the translational motions along the three axes can also be combined with at least one of the rotations around the three axes as described above. Thus, the parallel link robot 100 is movable in an arbitrary direction by an arbitrary angle with six degrees of freedom.

(5) Conclusion

As described above, in this embodiment, the rotation shafts 47 extend peripherally outward from the movable section 55, the third links 43 are connected to the rotation shafts 47, and the second links 42 are connected to the third links 43. Therefore, the end blocks 421 of the second links 42 are arranged at positions offset (positions deviated) from the positions of the rotation shaft 47. With such a configuration, the end blocks 421 of the second links 42 are separated from a movable region of the movable plate 55. Therefore, interference between the end blocks 421 and the movable plate 55 can be avoided and a range of rotational motion which is as large as possible can be provided with a relatively simple structure.

For example, if a universal-joint or ball-joint structure is used as a connection structure between the second links 42 and the movable plate 55, the range of rotational motion of the movable plate 55 is about 30° at most due to the structure thereof. Thus, the range is smaller in comparison with the structure in which the third links 43 are provided as in this embodiment.

Further, with the universal joint, backlash may occur due to the structure thereof, and hence the driving accuracy or positioning accuracy of the movable plate 55 is lowered.

Paper: Proposal of Link Composition for Rotational Parallel Mechanism with Pin Joints and Investigation of Movable Area (by Kazuya OKAWA, Yoshihiro Okamura) has disclosed a composite-type parallel link structure. Here, the composite type is a hybrid type including both of an inwardly bent type structure in which links are inwardly bent and an outwardly bent type structure in which links are outwardly bent. The parallel link structure 50 according to the present technology is the outwardly bent type structure.

In accordance with the paper, the composite-type parallel link structure described in the paper above is capable of taking a posture of 60°. However, it is a composite type, and hence there is a fear that backlash may more frequently occur and highly accurate motions will be difficult. On the contrary, the parallel link structure 50 according to this embodiment is capable of suppressing occurrence of backlash, which makes highly accurate motions possible.

2. Second Embodiment

Figure 10:
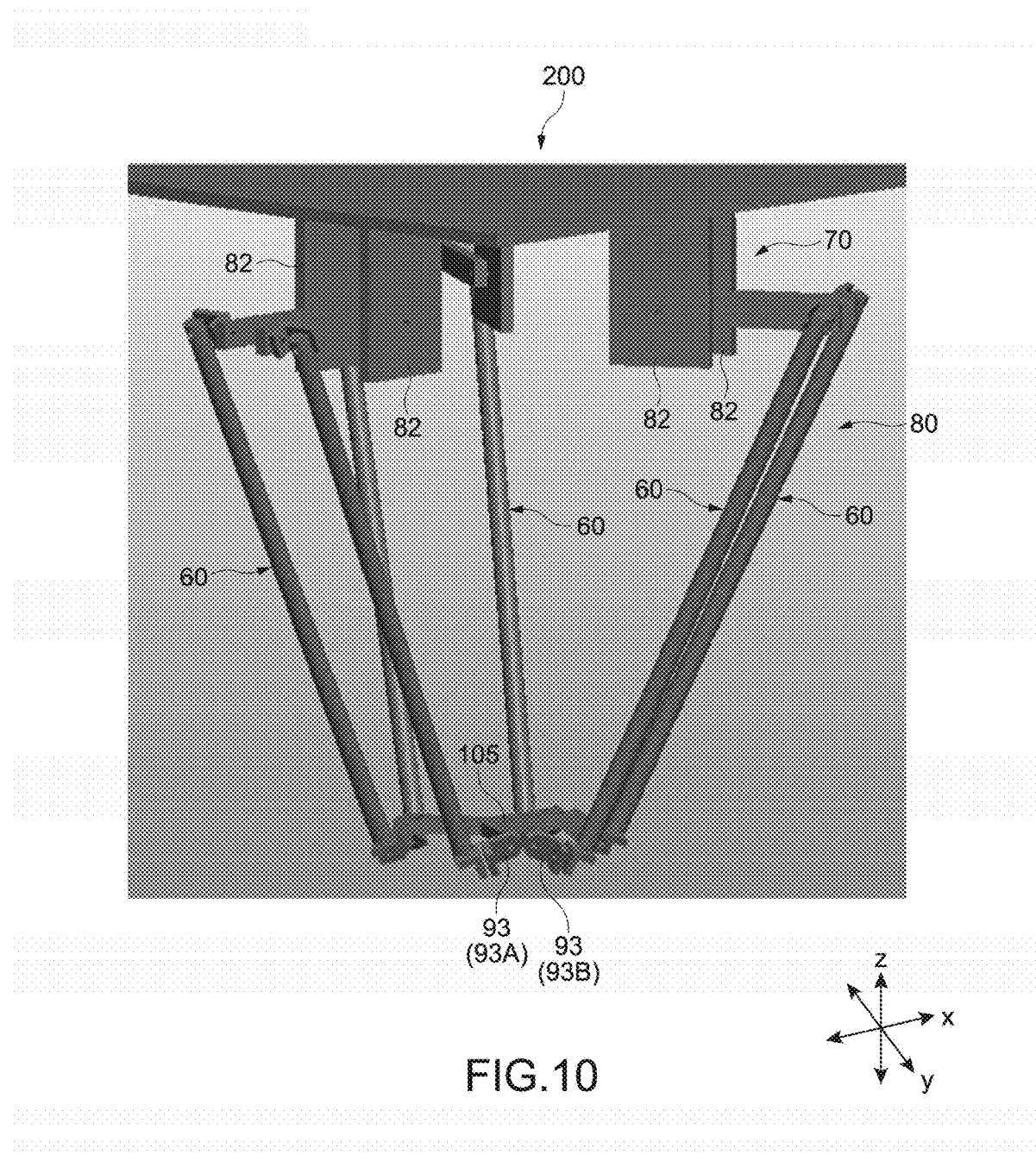
FIG. 10 is a perspective view showing a parallel link robot according to a second embodiment of the present technology.

FIG. 10 is a perspective view showing a parallel link robot 200 according to a second embodiment of the present technology. In the following description, elements substantially similar to the members, functions, and the like of the parallel link robot 100 according to the first embodiment will be denoted by identical symbols, descriptions thereof will be simplified or omitted, and different points will be mainly described.

The parallel link robot 200 includes a fixation unit 70 and a parallel link structure 80. In FIG. 10, illustrations of motors serving as driving sources for the fixation unit 70, driving axes thereof, and the like are omitted. This fixation unit 70 is different from the fixation unit 20 of the first embodiment. In this fixation unit 70, two supporting plates 82 are provided in a set. Three sets of supporting plates 82, that is, a total of six supporting plates 82 are provided. The motors (not shown) are fixed on the supporting plates 82. With this, six arms 60 are independently driven.

Figure 11:
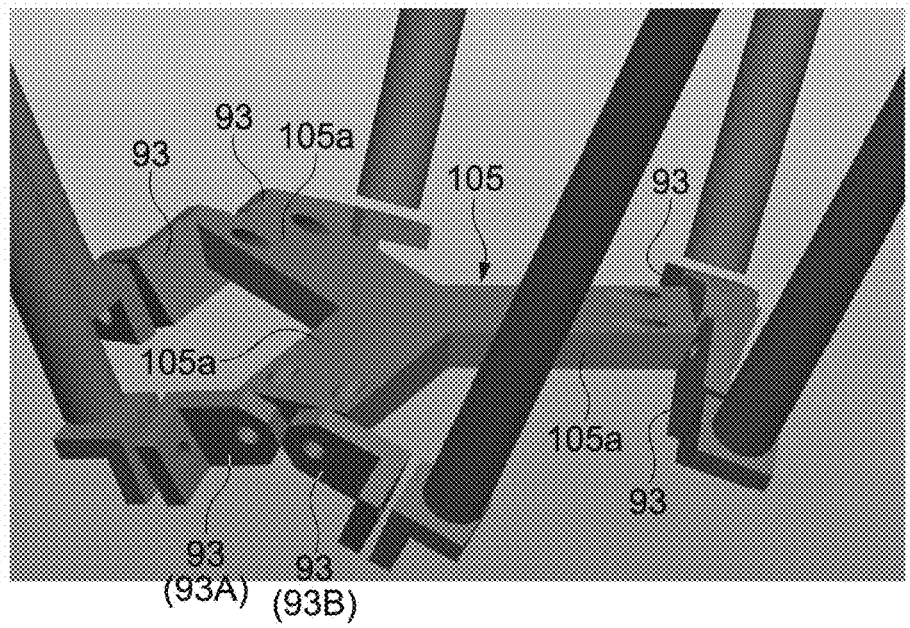
FIG. 11 A is a perspective view showing a movable plate and surrounding mechanisms.
Figure 11:
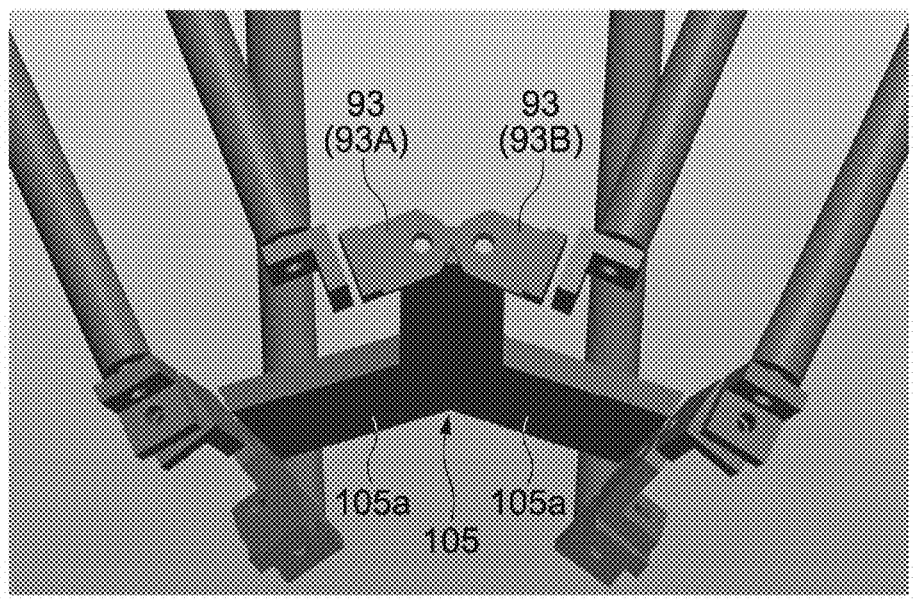

FIG. 11A is a perspective view showing a movable plate 105 and surrounding mechanisms. FIG. 11B is a perspective view thereof as viewed from below. The movable plate 105 includes three pieces 105a radially provided at 120° intervals around the center axis D (see FIG. 1). Each of the pieces 105a is provided with two rotation shafts (hereinafter, referred to as "second shaft sections" and illustration thereof is omitted), through which a pair of third links 93A and 93B is rotatably connected to this movable plate 105. Unlike the common single rotation shaft 47 as in the first embodiment, two third links 93 (pair of third links 93A and 93B) are independently connected to one of the pieces 105*a* through the second shaft sections according to this embodiment.

Figure 12:
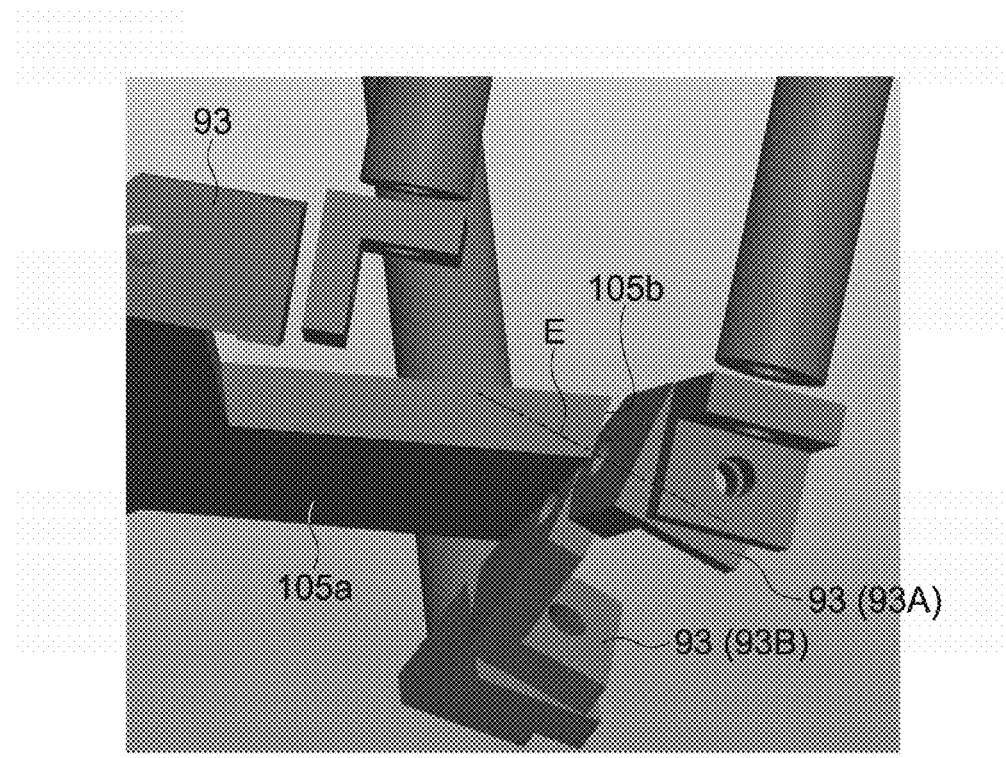
FIG. 12 A and FIG. 12 B show main parts of the second embodiment.
Figure 12:
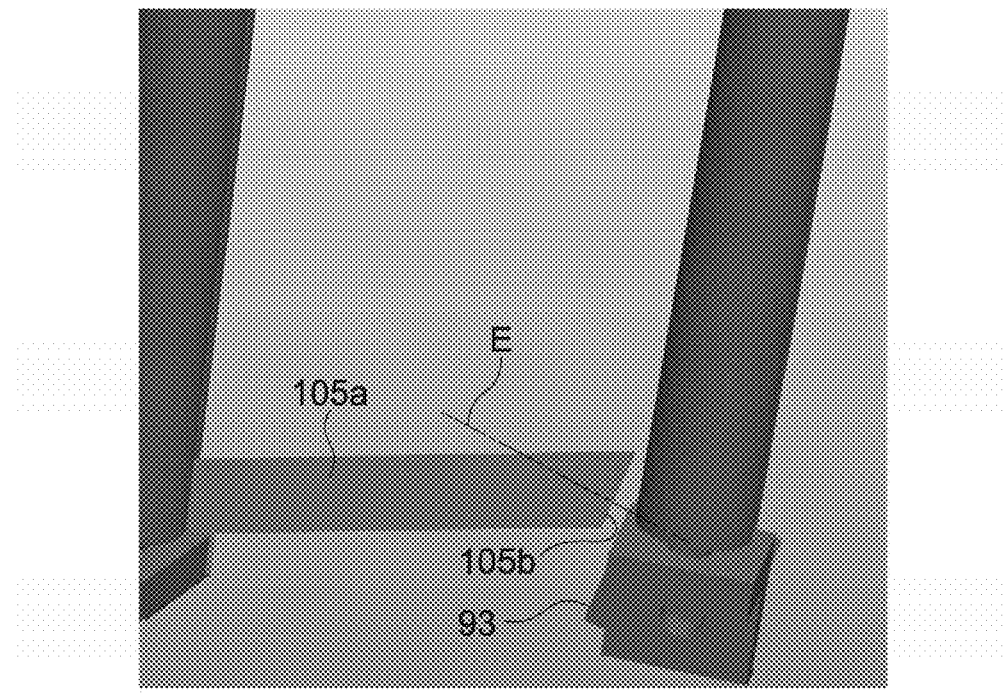

As shown in FIG. 12 A and FIG. 12 B, the second shaft sections are provided obliquely to a virtual plane including positions at which the second shaft sections are connected to the movable section. This virtual plane is a plane extending along a surface of the movable plate 105 in this embodiment. For example, the virtual plane is a plane extending along the x-y plane at the home position. End portions of the pieces 105*a* have taper surfaces 105*b*. Surfaces of the third links 93 face the taper surfaces 105*b* and the second shaft sections (not shown) are connected perpendicularly to the taper surfaces 105*b*. In each of FIG. 12 A and FIG. 12 B, an axial line extending along the second shaft sections is shown as a long dashed short dashed line E.

For example, the second shaft sections are provided such that the second shaft sections are spaced away from the fixation unit 70 in a direction of the center axis D (see FIG. 1) as the second shaft sections extend peripherally outward from the movable section 105. In other words, the second shaft sections are obliquely connected such that portions of the second shaft sections, which are farther from the center of the movable plate 105, are located downward in the z-axis.

A point at which the connection section 45 (see FIG. 1) is located in the axial line of the second shaft section is a singular point. It is a point where the parallel link structure 80 is locked and operations thereof become uncontrollable. The second shaft sections are obliquely provided in this parallel link structure 80, and hence the range of motion of the parallel link structure 80 before it reaches the singular point can be extended and a larger range of rotational motion can be provided. Specifically, a range of rotational motion of about ±80° can be provided around each of the x- and y-axes and a range of rotational motion of about ±60° can be provided around the z-axis.

3. Various Other Embodiments

The present technology is not limited to the above-mentioned embodiments and various other embodiments can be implemented.

The motors 15 of the fixation unit 20 are not limited to the arrangement as in the first embodiment and various modifications can be made. For example, instead of mounting the set of motors 15 on the single supporting plates 12*a*, a configuration in which the set of motors 15 may be mounted on two supporting plates 12*a* may be employed (as in second embodiment). Alternatively, the fixation unit according to the second embodiment may have the configuration as in the first embodiment. Alternatively, the set of motors 15 is not necessarily limited to the embodiment in which the directions of those motors are 180 degrees different from each other.

Linear motors, not rotation motors may be used as the motors 15.

In the above, the directions in which the rotation shafts 47 extend are the radial directions of the movable plate 55 (105). However, they do not necessarily need to be the radial directions (that is, directions orthogonal to tangents to outer periphery of movable plate). Any direction can be used therefor as long as they can extend in a spreading manner. That is, the directions in which the rotation shafts 47 extend do not need to be perpendicular to the tangents.

The shape of the movable plate 55 or 105 is not limited to the schematic triangle, the three-piece shape as in each of the above-mentioned embodiments. The movable plate 55 or 105 may have an arbitrary shape in a manner that depends on the range of motion.

The shape of the end block 421 of the second link 42 is not limited to the L-shape and may be a U-shape or an inverse C-shape. Further, the shape of the end block 421 is not limited to the right-angle L-shape and may be a shape having an angle slightly different from a right angle. Similarly, the shape of the third link 43 is also not limited to the L-shape. The same applies to the second embodiment.

In the above, the rotation shaft 47 through which the third links 43 are connected to the movable plate 55 is the rotation shaft common to the pair of third links. However, the third links 43 may be individually connected to the movable plate 55 via rotation shafts (as in second embodiment). In the second embodiment, the pair of third links 93A and 93B may be connected to the movable plate through a common single second shaft section as in the first embodiment.

As shown in FIG. 1, the connection sections 45 include the rotation shafts 45*a* and the connection blocks 45*b* and has degrees of freedom of rotation around the two axes. However, the connection sections 45 may be replaced by mechanisms such as universal joints and ball joints. The same applies to the second embodiment.

The parallel link robot according to the present technology is used as an assembly robot and also used for other purposes as follows. For example, the parallel link robot according to the present technology is used for box packing work of products, inspection of products, and evaluation of response accuracy of touch panels (e.g., hand writing inputs). For inspection of products, the parallel link robot is capable of sensing products at various angles when a sensor such as a camera is mounted on the movable plate, for example.

Alternatively, the parallel link robot according to the present technology is also applicable to a multi-axis table, a medical manipulator, and the like.

At least two feature parts of the feature parts of the above-mentioned embodiments can also be combined.

It should be noted that the present technology may also take the following configurations.

(1)
A parallel link robot, including:
a fixation unit including a plurality of driving sources;
a movable section for operation;
a plurality of first links connected to the plurality of driving sources;
a plurality of connection sections rotatably connected to the plurality of first links;
a plurality of second links rotatably connected to the plurality of first links via the plurality of connection sections;
a plurality of first shaft sections rotatably connected to the plurality of second links;
a plurality of third links rotatably connected to the plurality of second links via the plurality of first shaft sections; and
a plurality of second shaft sections through which the plurality of third links are rotatably connected to the movable section, the plurality of second shaft sections extending peripherally outward from the movable section.

(2)
The parallel link robot according to (1), in which
the plurality of third links constitute a pair of third links constituted of two third links, and the pair of third links is connected to the movable section through one second shaft section of the plurality of second shaft sections.

(3)

The parallel link robot according to (2), in which the pair of third links has different lengths.

(4)

The parallel link robot according to any one of (1) to (3), in which the plurality of second links, the plurality of third links, and the movable section are arranged such that a virtual plane including connection positions of the plurality of first shaft sections in the plurality of second links is located farther from the fixation unit than a virtual plane including connection positions of the plurality of second shaft sections in the movable section.

(5)

The parallel link robot according to any one of (1) to (4), in which at least one of the plurality of third links is constituted of an L-shaped block.

(6)

The parallel link robot according to (1), in which the plurality of driving sources include a set of driving sources including a set of parallel output shafts.

(7)

The parallel link robot according to (6), in which the fixation unit includes a support that supports the set of driving sources such that output shafts of the set of driving sources are non-coaxial.

(8)

The parallel link robot according to (7), in which the support includes a supporting plate or a supporting frame configured such that the output shafts pass therethrough, the supporting plate or the supporting frame being provided between main bodies of the set of driving sources.

(9)

The parallel link robot according to (1), in which the plurality of first links include a set of first links constituted of two first links, the plurality of second links include a set of second links constituted of two second links, the plurality of third links include a set of third links constituted of two third links, and the set of first links, the set of second links, and the set of third links constitute one ore more sets of arms.

(10)

The parallel link robot according to (9), in which the plurality of sets of arms are arranged at equal intervals around a virtual center axis linking a center of the fixation unit with a center of the movable section.

(11)

The parallel link robot according to (1), in which the plurality of second shaft sections are provided obliquely to a virtual plane including positions at which the second shaft sections are connected to the movable section.

(12)

The parallel link robot according to (11), in which the plurality of second shaft sections are provided such that the plurality of second shaft sections are spaced away from the fixation unit in a direction of a virtual center axis linking a center of the fixation unit with a center of the movable section as the plurality of second shaft sections extend peripherally outward from the movable section.

(13)

A parallel link robot, including:

a fixation unit including a plurality of driving sources;

a movable section for operation;

a plurality of first links connected to the plurality of driving sources;

a plurality of connection sections rotatably connected to the plurality of first links;

a plurality of second links rotatably connected to the plurality of first links via the plurality of connection sections;

a plurality of first shaft sections rotatably connected to the plurality of second links;

a plurality of third links rotatably connected to the plurality of second links via the plurality of first shaft sections; and a plurality of second shaft sections with the plurality of third links being rotatably connected to the movable section, in which the plurality of second links are connected to the movable section via the plurality of third links such that end portions of the plurality of second links, to which the plurality of first shaft sections are connected, are arranged at positions offset from the plurality of second shaft sections peripherally outward from the movable section.

(14)

A parallel link structure, including:

a movable section for operation;

a plurality of first links connected to the plurality of driving sources;

a plurality of connection sections rotatably connected to the plurality of first links;

a plurality of second links rotatably connected to the plurality of first links via the plurality of connection sections;

a plurality of first shaft sections rotatably connected to the plurality of second links;

a plurality of third links rotatably connected to the plurality of second links via the plurality of first shaft sections; and a plurality of second shaft sections through which the plurality of third links are rotatably connected to the movable section, the plurality of second shaft sections extending peripherally outward from the movable section.

(15)

A parallel link structure for a robot, the robot including a movable section for operation, a plurality of first links connected to the plurality of driving sources, a plurality of connection sections rotatably connected to the plurality of first links, and a plurality of second links rotatably connected to the plurality of first links via the plurality of connection sections, the parallel link structure including:

a plurality of first shaft sections rotatably connected to the plurality of second links;

a plurality of third links rotatably connected to the plurality of second links via the plurality of first shaft sections; and a plurality of second shaft sections with the plurality of third links being rotatably connected to the movable section, in which the plurality of second links are connected to the movable section via the plurality of third links such that end portions of the plurality of second links, to which the plurality of first shaft sections are connected, are arranged at positions offset from the plurality of second shaft sections peripherally outward from the movable section.

12 support 12a supporting plate 15 motor
17 output shaft
20 fixation unit
41 first link
42 second link
43, 93 third link
45 connection section
46, 47 rotation shaft
50, 80 parallel link structure
55, 105 movable plate
100, 200 parallel link robot

The invention claimed is:

1. A parallel link robot, comprising:
a fixation unit including a plurality of driving sources;
a movable section;
a plurality of first links connected to the plurality of driving sources;
a plurality of connection sections rotatably connected to the plurality of first links;
a plurality of second links rotatably connected to the plurality of first links via the plurality of connection sections;
a plurality of first shaft sections rotatably connected to the plurality of second links;
a plurality of third links rotatably connected to the plurality of second links via the plurality of first shaft sections; and
a plurality of second shaft sections, wherein
the plurality of third links are rotatably connected to the movable section via the plurality of second shaft sections,
the plurality of second shaft sections extends peripherally outward from the movable section,
the plurality of driving sources includes parallel output shafts.

2. The parallel link robot according to claim 1, wherein the plurality of third links includes a pair of third links, and
the pair of third links is connected to the movable section via one second shaft section of the plurality of second shaft sections.

3. The parallel link robot according to claim 2, wherein a length of each of the pair of third links is different.

4. The parallel link robot according to claim 1, wherein
a first virtual plane at a first distance from the fixation unit,
the first virtual plane includes connection positions of the plurality of first shaft sections in the plurality of second links,
a second virtual plane is at a second distance from the fixation unit,
the second virtual plane includes connection positions of the plurality of second shaft sections in the movable section, and
the first distance is greater than the second distance.

5. The parallel link robot according to claim 1, wherein at least one of the plurality of third links includes an L-shaped block.

6. The parallel link robot according to claim 1, wherein the fixation unit further includes a support element that is configured to support the plurality of driving sources such that the parallel output shafts are non-coaxial.

7. The parallel link robot according to claim 6, wherein the support element includes one of a supporting plate or a supporting frame;
one of the supporting plate or the supporting frame is configured such that the parallel output shafts passes therethrough, and
one of the supporting plate or the supporting frame is between main bodies of the plurality of driving sources.

8. The parallel link robot according to claim 1, further comprising at least one set of arms, wherein
the at least one set of arms includes the plurality of first links, the plurality of second links, and the plurality of third links,
the plurality of first links includes two first links,
the plurality of second links includes two second links, and
the plurality of third links includes a two third links.

9. The parallel link robot according to claim 1, further comprising a plurality of sets of arms, wherein
the plurality of sets of arms includes the plurality of first links, the plurality of second links, and the plurality of third links,
the plurality of sets of arms is at equal intervals around a virtual center axis, and
the virtual center axis links a center of the fixation unit with a center of the movable section.

10. The parallel link robot according to claim 1, wherein the plurality of second shaft sections are at an oblique angle to a virtual plane, and
the virtual plane includes positions at which the second shaft sections are connected to the movable section.

11. The parallel link robot according to claim 9, wherein the plurality of second shaft sections is at a specific distance from the fixation unit in a direction of the virtual center axis as the plurality of second shaft sections extends peripherally outward from the movable section.

12. A parallel link robot, comprising:
a fixation unit including a plurality of driving sources;
wherein the plurality of driving sources includes parallel output shafts;
a movable section;
a plurality of first links connected to the plurality of driving sources;
a plurality of connection sections rotatably connected to the plurality of first links;
a plurality of second links rotatably connected to the plurality of first links via the plurality of connection sections;
a plurality of first shaft sections rotatably connected to the plurality of second links;
a plurality of third links rotatably connected to the plurality of second links via the plurality of first shaft sections; and
a plurality of second shaft sections with the plurality of third links being rotatably connected to the movable section, wherein
the plurality of second links are connected to the movable section via the plurality of third links such that end portions of the plurality of second links, are at positions offset from the plurality of second shaft sections, and
the positions being offset are peripherally outward from the movable section.

13. A parallel link structure, comprising:
a movable section;
a plurality of first links connected to a plurality of driving sources via parallel output shafts,
wherein the plurality of driving sources includes the parallel output shafts;
a plurality of connection sections rotatably connected to the plurality of first links;

a plurality of second links rotatably connected to the plurality of first links via the plurality of connection sections;

a plurality of first shaft sections rotatably connected to the plurality of second links;

a plurality of third links rotatably connected to the plurality of second links via the plurality of first shaft sections; and a plurality of second shaft sections, wherein the plurality of third links are rotatably connected to the movable section via the plurality of second shaft sections, and the plurality of second shaft sections extends peripherally outward from the movable section.

14. A parallel link structure, comprising:

a plurality of first links connected to a plurality of driving sources via a parallel output shafts, wherein the plurality of driving sources includes the parallel output shafts, a plurality of second links rotatably connected to the plurality of first links;

a plurality of first shaft sections rotatably connected to the plurality of second links;

a plurality of third links rotatably connected to the plurality of second links via the plurality of first shaft sections; and a plurality of second shaft sections with the plurality of third links being rotatably connected to a movable section, wherein the plurality of second links are connected to the movable section via the plurality of third links such that end portions of the plurality of second links, are at positions offset from the plurality of second shaft sections, and the positions being offset are peripherally outward from the movable section.

15. A parallel link robot, comprising:

a fixation unit including a plurality of driving sources;

a movable section;

a plurality of first links connected to the plurality of driving sources;

a plurality of connection sections rotatably connected to the plurality of first links;

a plurality of second links rotatably connected to the plurality of first links via the plurality of connection sections;

a plurality of first shaft sections rotatably connected to the plurality of second links;

a plurality of third links rotatably connected to the plurality of second links via the plurality of first shaft sections; and a plurality of second shaft sections, wherein the plurality of third links are rotatably connected to the movable section via the plurality of second shaft sections, the plurality of second shaft sections extends peripherally outward from the movable section, the plurality of third links include a plurality of pairs of third links, each of the plurality of pairs of third links includes two third links, and the plurality of driving sources are configured to independently drive each of the plurality of pairs of third links.

* * * * *